United States Patent [19]

Imazeki et al.

[11] Patent Number: 4,589,091
[45] Date of Patent: May 13, 1986

[54] NUMERICAL CONTROL DEVICE

[75] Inventors: Ryoji Imazeki, Hachioji; Mitsuo Kurakake, Kokubunji, both of Japan

[73] Assignee: Fanuc Ltd., Minamitsuru, Japan

[21] Appl. No.: 572,137

[22] PCT Filed: Jun. 30, 1980

[86] PCT No.: PCT/JP80/00149
§ 371 Date: Mar. 2, 1981
§ 102(e) Date: Feb. 20, 1981

[87] PCT Pub. No.: WO81/00158
PCT Pub. Date: Jan. 22, 1981

Related U.S. Application Data

[63] Continuation-in-part of Ser. No. 243,935, Mar. 2, 1981, abandoned.

[30] Foreign Application Priority Data

Jun. 30, 1979 [JP] Japan .............................. 54-90562[U]

[51] Int. Cl.⁴ .......................... G06F 7/00; G06F 13/00
[52] U.S. Cl. ...................................... 364/900; 364/167
[58] Field of Search ...................... 364/167, 184, 187; 371/13

[56] References Cited

U.S. PATENT DOCUMENTS

| | | | |
|---|---|---|---|
| 4,068,297 | 1/1978 | Komiya | 364/167 X |
| 4,128,891 | 12/1978 | Lin et al. | 364/900 |
| 4,195,341 | 3/1980 | Joyce | 364/200 |
| 4,209,847 | 6/1980 | Noda et al. | 364/167 X |
| 4,210,959 | 7/1980 | Wozniak | 364/200 |
| 4,237,544 | 12/1980 | Bonyhard | 364/900 |
| 4,288,851 | 9/1981 | Manabe et al. | 364/167 X |
| 4,335,447 | 6/1982 | Jerrim | 364/900 |

OTHER PUBLICATIONS

System Utilizing Low Cost Control Store Backing Memory; R. P. Fletcher, IBM Technical Disclosure Bulletin, vol. 20, No. 10, Mar. 1978, pp. 4226–4229.

Primary Examiner—Edward J. Wise
Attorney, Agent, or Firm—Staas & Halsey

[57] ABSTRACT

A numerical control device having a non-volatile, large-capacity magnetic bubble memory and a volatile, high-speed integrated circuit memory as memories for storing machining program data. Machining program data which has been stored in the magnetic bubble memory is transferred to and stored in the integrated circuit memory through an interface circuit by introducing power from a power source, the interface circuit functioning to administer the transfer of the data between both of the memories. Numerical control processing is executed by allowing a processor to access the integrated circuit memory.

5 Claims, 3 Drawing Figures

NUMERICAL CONTROL DEVICE

This application is a continuation-in-part, of application Ser. No. 243,935, filed Mar. 2, 1981, now abandoned.

BACKGROUND OF THE INVENTION

Priority benefit is claimed for this application based on application Ser. No. PCT/00149, filed on Oct. 3, 1980, based on Japanese Application No. 90562/79, filed June 30, 1979.

This invention relates to a numerical control device having both a magnetic bubble memory and an integrated circuit memory (hereinafter IC memory) as memories for storing machining program data, and more particularly to a numerical control device capable of high-speed numerical control processing wherein machining program data is transferred to and stored in a high-speed IC memory from a non-volatile, large-capacity magnetic bubble memory by introducing power from a power source.

A numerical control device of the stored program type executes a numerical control process in accordance with a control program and machining program data which are stored in a memory in advance. Until recently, core memories have been used to store the machining program data in such numerical control devices, but there is now a growing trend toward the use of magnetic bubble memories for this purpose. The reason is that it is possible to provide a less expensive numerical control device since the magnetic bubble memory allows a large functional packing density to be achieved and is therefore less costly than a core memory, though both types of memory are similar in that they are non-volatile and large in capacity.

While the magnetic bubble memory is advantageous in that it is inexpensive and capable of retaining its memory in the event of an interruption in power, a read/write operation is performed in page units (10 to 20 bytes), and a disadvantageously long access time of several miliseconds per page is required. Hence, when a processor accesses the magnetic bubble memory directly in an effort to execute a numerical control process, program execution time is prolonged so that it becomes impossible to realize high-speed numerical control processing.

SUMMARY OF THE INVENTION

Accordingly, it is an object of the present invention to provide an inexpensive numerical control device which allows high-speed numerical control processing even if a magnetic bubble memory is employed as the memory means.

In accordance with the present invention, a non-volatile, large-capacity magnetic bubble memory and a high-speed IC memory are provided as the memories for machining program data and for other forms of data, as well as an interface circuit for administering the transfer of data between these two memories. Machining program data and other machining data that has been stored in the magnetic bubble memory is transferred through the interface circuit and stored in the IC memory by connecting the numerical control device power source to the circuitry, the numerical control process being executed by accessing the IC memory. Thus, the processor which is built in the numerical control device need only access the high-speed IC memory in the processing of numerical control, allowing such processing to be performed at a high speed. The overall cost of the system can be reduced even though the magnetic bubble memory is combined with the integrated circuit memory, since such combination is still much lower in cost than the core memory. Furthermore, since the machining program data and other machining data stored in the magnetic bubble memory are not destroyed in the event of an interruption in power or a power failure, the numerical control processing can be resumed following the reintroduction of power merely by repeating initial loading. This greatly simplifies the task of the operator.

DESCRIPTION OF THE PREFERRED EMBODIMENT

Reference will now be had to the accompanying drawings for a more detailed description of the present invention.

Figure 1:
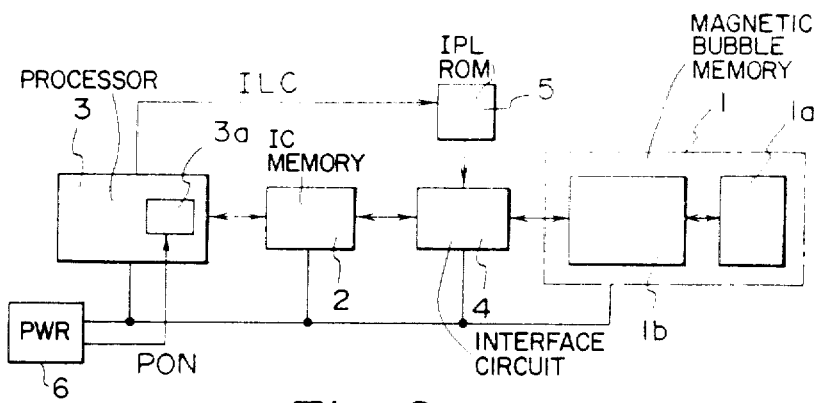
FIG. 1 is a block diagram showing the principal portions of a numerical control device in accordance with the present invention.

FIG. 1 is a block diagram showing the principal portions of a numerical control device in accordance with the present invention. In FIG. 1, an interface circuit is shown in simplified form, and hardware such as a pulse distributor has been deleted. The simplified interface circuit administers the transfer of data between a control program memory and a machine tool, which is not illustrated. Designated at numeral 1 is a field-actuated magnetic bubble memory having a bubble memory element 1a which stores machining program data for execution as well as other forms of machining data, and a read/write control circuit 1b. The control circuit 1b includes a number of elements which are not shown, such as drivers for driving the coils in the bubble memory element and for driving a variety of gates, sense amplifiers for reading outputs, and circuits for generating coil and gate drive signals. Further provided are a rapidly accessable IC memory 2 and a processor 3. The latter accesses the IC memory 2 and executes numerical control processing in accordance with the machining program data which has been stored in the IC memory. A sequence circuit 3a, which may comprise a read-only memory (ROM), is incorporated in the processor 3. Stored in the ROM is a microprogram for controlling processing procedure in connection with various micro instructions included in the machining program data, and for controlling initial loading, which will be described later, following the connection of power to the system. An interface circuit 4 is provided between the magnetic bubble memory 1 and the integrated circuit memory 2 to administer the transfer of machining program data between these two units. More specifically, the interface circuit 4 performs a serial-to-parallel conversion in which bit serial information read out from the magnetic bubble memory bit-by-bit is partitioned into single byte units, the converted information then being transferred to the integrated circuit memory 2. Thus the interface circuit 4 includes such components as a read/write control circuit, a buffer register for storing data temporarily and a serial-to-parallel converter. An initial program loader 5 comprises a ROM responsive to an initial load start command ILC from the processor 3 to start a previously stored initial loading program in accordance with which the interface circuit 4 is controlled to transfer the machining program data and other machining data, which has been stored in the magnetic bubble memory 1, to the integrated circuit memory 2 where the data is then stored. PON denotes a power source enable signal produced by the power source 6.

The numerical control device of the present invention operates in the following manner. The generation of the power source enable signal PON actuates the sequence circuit 3a, whereby the initial load start command ILC is applied to the initial program loader 5 which responds by starting the initial loading program and by sending control signals to the interface circuit 4. The interface circuit 4, on the basis of the control signals, performs a page-by-page read-out of the machining program data stored in the bubble memory element 1a, partitions the data into single byte units, and transfers the data to the IC memory 2 where it is stored. This completes the initial loading operation. The processor 3, after the total content of the bubble memory element 1a has been transferred to and stored in the IC memory 2, need only access the IC memory to execute data processing at a high speed.

Figure 2:
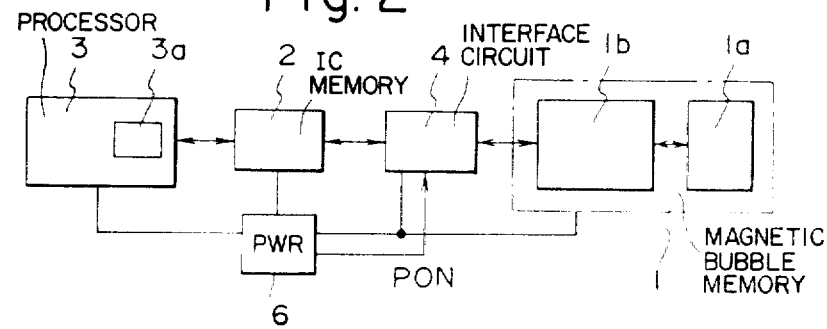
FIG. 2 is a block diagram showing the principal portions of another embodiment in accordance with the present invention.

FIG. 2 is a block diagram showing another embodiment of the present invention. In FIG. 2, portions similar to those shown in FIG. 1 are designated by like reference characters and are not described in detail in order to avoid prolixity.

The arrangement of FIG. 2 differs from that of FIG. 1 in that the power source enable signal PON is applied directly to the interface circuit 4. Specifically, when the power source enable signal PON is generated, by the power source 6 the read/write control circuit contained within the interface circuit 4 is adapted to immediately send the magnetic bubble memory 1 a read signal as well as an address signal indicative of the leading address of the location from which data is to be read. As a result, one page of the contents (machining program data), stored at the location of the above address, is read out under the control of the control circuit 1b and delivered to the interface circuit 4 in the form of a bit serial, that is, as serial data. The interface circuit 4 then partitions the serial data into single byte units to form parallel data which is transferred to the IC memory 2. Thereafter, the interface circuit 4 successively delivers the address signals and the read signals whereby the machining program data stored in the bubble memory element 1a is sequentially transferred to, and stored in, the IC memory 2 as described above. When the power source enable signal PON is generated, therefore, the total contents stored in the bubble memory element 1a is initially loaded into the IC memory 2 automatically by the hardware of the interface circuit 4, after which the processor 3 accesses the IC memory 2 to execute high-speed numerical control processing.

Figure 3:
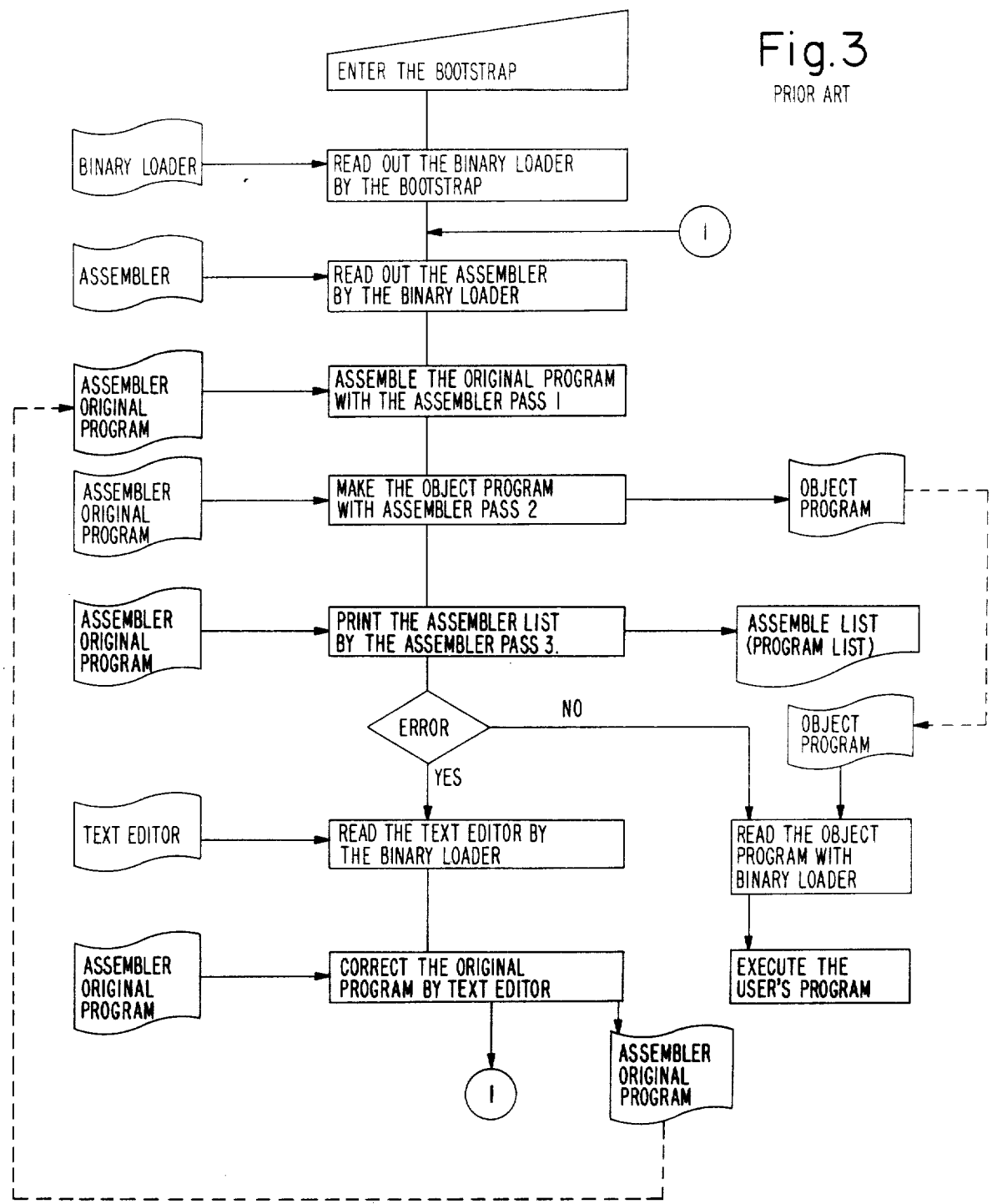
FIG. 3 is flow chart of a prior art program capable of providing the function of an initial program loader.

The interface circuit 4 and the initial program loader program (see FIG. 3) are standard items well known to those of skill in the art. The method of integration of the magnetic bubble memory 1 into the disclosed system through the interface circuit 4 is within the skill of those in the art and the specific details relating to such, and the details of an initial program loader can be found, for example, in "Magnetic Bubble Memory Devices and Applications", by Garen, *Computer Design*, February 1978; "Megabit Bubble Modules Move in on Laser Storage", by Mavity, *Electronics*, Mar. 29, 1979; and *Knowledge of Software*, by Yada, 1970, Ohm Bookstore Company Ltd, Japan.

While the present invention has been described and illustrated for cases in which all of the data stored in the bubble memory element is transferred to and stored in the IC memory en bloc only after the power source has been connected, it is possible to make the transfer not only at the above time but at any suitable time, as may be desired if the IC memory has a small capacity. For example, the content of the IC memory can be updated by transferring the data in the bubble memory element to the IC memory in small increments in accordance with the progress of the machining program.

It should be obvious from the foregoing description that the present invention is well-suited for application in numerical control devices for controlling machine tools and robots.

What is claimed is:

1. A memory system for a numerical control device having a power source, having a memory, and having a processor connected to said memory, the processor for executing numerical control processing on the basis of data stored in said memory, wherein said memory system comprises:

a magnetic bubble memory;

an integrated circuit memory; and an interface circuit, connected between said magnetic bubble memory and said integrated circuit memory and connected to the power source, for transferring data between said magnetic bubble memory and said integrated circuit memory so that the data stored in said magnetic bubble memory is transferred to and stored in said integrated circuit memory through said interface circuit when power from the power source of the numerical control device is applied thereto, wherein numerical control processing is executed in accordance with the data in said integrated circuit memory.

2. A numerical control device, comprising:

numerical control porcessor means for executing numerical control processing;

an integrated circuit memory connected to said numerical control processor means;

a magnetic bubble memory; and an interface circuit, connected between said integrated circuit memory and said magnetic bubble memory, for transferring data from said magnetic bubble memory to said integrated circuit memory.

3. A numerical control device as recited in claim 2, further comprising:

a power source, connected to said numerical control processor means, to said integrated circuit memory, to said interface circuit and to said magnetic bubble memory, for generating a power source enable signal, wherein when the power source enable signal is received by said numerical control processor means, said numerical control processor means generates an initial load command; and an initial program loader memory, within said numerical control processor means and said interface circuit being connected to said numerical control processor means, for storing control signals and for outputting the control signals when the initial load command is generated and wherein when said interface circuit receives the control signals, said interface circuit transfers the data from said magnetic bubble memory to said integrated circuit memory.

4. A numerical control device as recited in claim 2, further comprising a power source, connected to said numerical control processor means, to said integrated circuit memory, to said interface circuit and to said magnetic bubble memory, for generating a power source enable signal, wherein when said interface circuit receives the power source enable signal said interface circuit transfers the data from said magnetic bubble memory to said integrated circuit memory.

5. A fast/slow memory system for a numerical controller, comprising:
a memory hierarchy comprising a magnetic bubble memory and an integrated circuit memory;

a processor, connected to said integrated circuit memory, for executing data processing on the basis of data stored in said integrated circuit memory; and an interface circuit, connected between said magnetic bubble memory and said integrated circuit memory, for controlling the transfer of said data between said magnetic bubble memory and said integrated circuit memory, a numerical control program being stored in said magnetic bubble memory as said data, the numerical control program stored in said magnetic bubble memory being transferred to said integrated circuit memory through said interface circuit by introducing power and said processor performing numerical control processing under the control of the numerical control program stored in said integrated circuit memory.

* * * * *